3,753,902
FILTERABILITY OF WATER SUSPENDED
MASSES
Hans Stettler, Basel, Switzerland, assignor to Sandoz Ltd.
(also known as Sandoz AG), Basel, Switzerland
Filed July 2, 1970, Ser. No. 51,814
Claims priority, application Switzerland, July 4, 1969,
10,219/69
Int. Cl. B01d 21/00, 39/02
U.S. Cl. 210—54   18 Claims

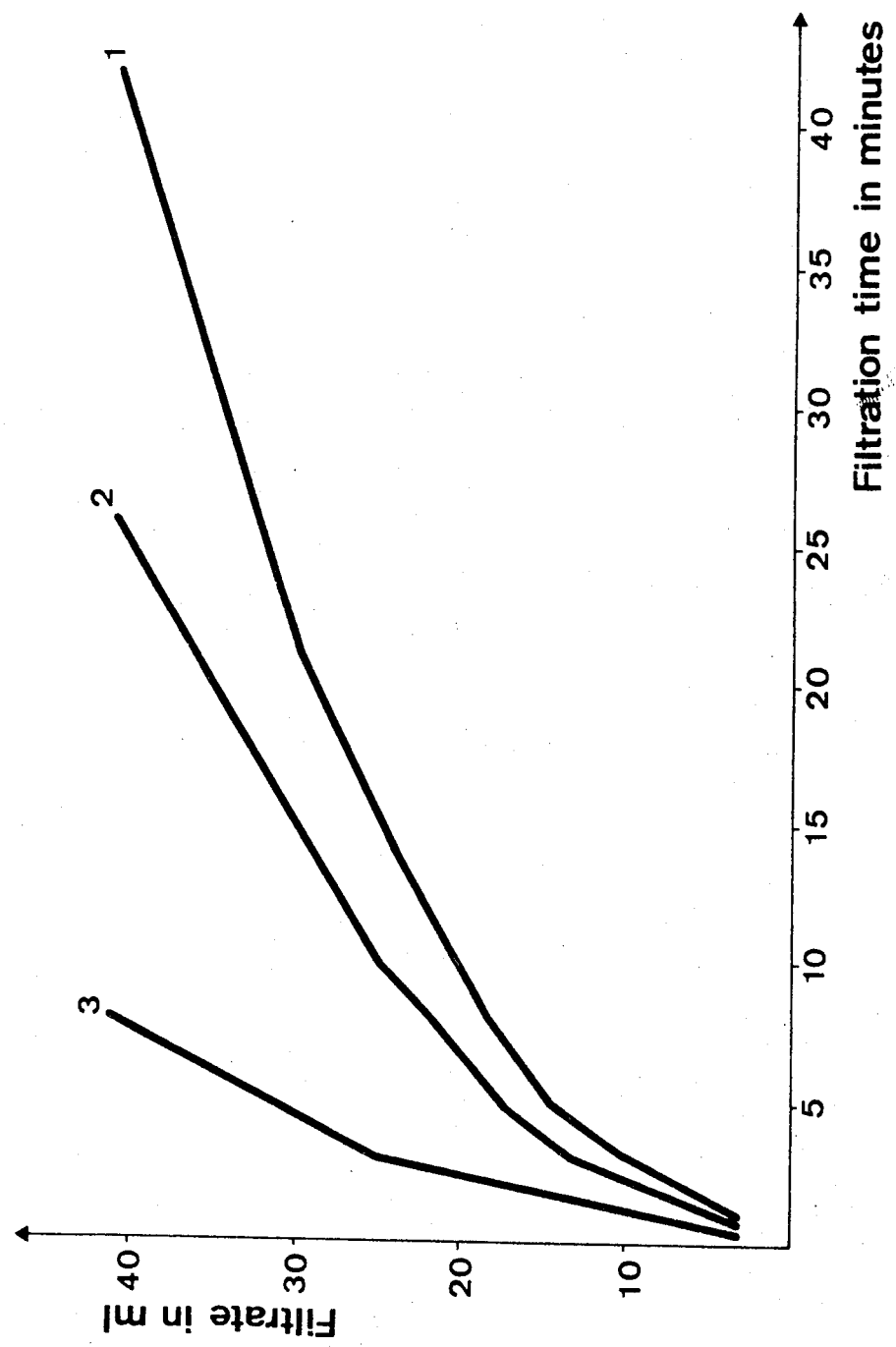

ABSTRACT OF THE DISCLOSURE

Water suspended inorganic masses, especially cement slurries, of improved filtrability, obtained adding thereto cation active polyamines and/or polyamidamines, guanidine derivatives as in U.S. patent application No. 812,441 and optionally Ca(OH)$_2$.

The Belgian Pat. No. 729,915 discloses a process for producing a water suspended, swellable, mineral mass having an improved filterability, which comprises incorporating in said mass a filtration aid constituted by a water soluble, basic nitrogen-containing compound, which has the effect of improving the fastness to moisture of substantive dyestuffs on cellulose fibres, in an amount of from 0.005 to 0.2% by weight based on the total solids present. Compounds of this type and products containing such compounds are described, for example, in Diserens, "Neueste Fortschritte und Verfahren in der chemischen Technologie der Textilfasern," Part I, and in the same author's "Die neuesten Fortschritte in der Anwendung der Farbstoffe," vol. 2, second impression (1949), pp. 46–111.

Compounds of the stated type which are especially suitable for the present purpose are those of formula

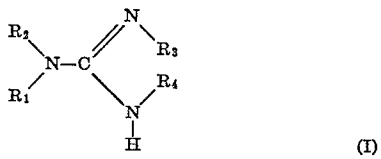

where $R_1$ stands for a hydrogen atom,

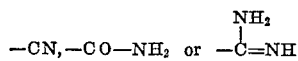

$R_2$ or $R_4$ for a hydrogen atom, a lower alkyl or hydroxyalkyl or a mononuclear aryl group,
$R_3$ for a hydrogen atom or a substituted or unsubstituted amino group which is bound through a lower alkylene group and may form part of a heterocyclic ring,
$R_4$ or $R_2$ for a substituted or unsubstituted amino group which is bound through a lower alkylene group and may form part of a heterocyclic ring.

Examples of compounds of the Formula I are the products obtained by condensation of formaldehyde with compounds of the formula

wherein $R_5$ represents hydrogen, —CN or —CO—NH$_2$, optionally in the presence of ammonium salts of strong inorganic acids.

Such compounds are described, for example, in Melliand Textilberichte 48 1456–60 (1967), further in German Pat. Nos. 671,704 and 767,276.

Further examples of compounds of the Formula I are the condensation products of an aliphatic polyamine with cyanamide, dicyandiamide, dicyandiamidine or guanidine which are described in German Pat. No. 855,001.

Other likewise suitable compounds are such as are described in U.S. Pat. No. 2,374,354 and in West German Pat. No. 1,111,114.

It has now been found that the filterability of aqueous suspensions of inorganic substances which swell in water can be substantially improved by employing guanidine derivatives of Formula I in conjunction with cation-active polyamines and/or polyamide amines.

The present invention thus provides a process for producing a water suspended swellable mass of inorganic materials of improved filterability which comprises incorporating in said mass filtration aids constituted by cation-active polyamines and/or polyamideamines and by guanidine derivatives of Formula I. The inorganic materials may be hydrophilic mineral or non-mineral substances with micells of greater than colloidal size, e.g. of the order of 0.1 to 2 microns.

In this context the term "hydrophilic mineral or non-mineral substances" comprises a wide variety of inorganic materials, including oxides, hydroxides and anhydrides; acid, basic and neutral salts; minerals which may contain calcium, magnesium and/or alkali metals or mixtures of such inorganic materials; examples of the mentioned inorganic materials are: aluminium sesquioxide; bauxite; metallates, e.g. aluminates, ferrates, titanates; silica; silicates and silicoaluminates, e.g. zirconia, cordierite, illite, steatite, talcum, bentonite, montmorillonite, halloysite, beidellite, kaolinite; porcelain slips; argillaceous earths of various composition with a greater or lesser fat content, e.g. grades containing iron, manganese, magnesium and lime which are used for the manufacture of paints and ceramics, both stoneware and earthenware, e.g. grés or cement.

The aforestated filtration aids are especially valuable for addition to crude cement slurries which are to be processed as acid, basic or neutral cements of up to 75% lime content for example as hydraulic bonding agents, quick-setting cements or other special types such as magnesium and aluminum cements. It may be mentioned that the aforedefined filtration assistants can also be employed with argillaceous earths as plasticity regulators.

In aqueous suspensions of the aforenamed inorganic substances water molecules are attracted into and onto the suspended hydrophilic micells, which leads to swelling and inhibits, i.e. slows down the rate of filtration. In consequence the filtered material tends to contain an undesirably high amount of water. In order to achieve rapid and efficient filtration it is necessary to break down the hydrate film on the micells. This can be accomplished by the addition of heteropolar compounds.

The hydrate film, for instance in cement slurries, can be partially decomposed by the addition of inorganic compounds such as calcium hydroxide. But results better than those with calcium hydroxide are obtained by using guanidine derivatives as dehydrating agents, as described in Belgian Pat. No. 729,915. The rate of filtration of suspensions and slurries is, however, accelerated yet further to a notable degree by the addition of assistants conforming to the present invention. If desired calcium hydroxide can be added to these assistants prior to use.

Examples of cation-active polyamideamines suitable for the stated purpose are the polycondensation products of the esters of acrylic, phenylacrylic; metacrylic and crotonic acids with alkylene diamines, e.g.

$$H_2N-(CH_2)_n-NH_2$$

where n represents 2 to 6 and $$H_2N-(CH_2)_n-\underset{\underset{R}{|}}{N}-(CH_2)_n-NH_2$$

where R represents hydrogen or lower alkyl, e.g. methyl, ethyl or propyl, in which secondary amino groups are quaternated with alkylating agents such as methyl or ethyl sulphate. The polymers which are produced by condensation of methylacrylate with ethylene diamine, diethylene triamine, di-N-(β-aminoethyl)-methylamine and di-N-(γ-aminopropyl)-methylamine respectively and quaternated with dimethyl sulphate, diethylsulphate or epichlorhydrine may be instanced as examples, of which preferably the polymerisation product of methyl acrylate and diethylene triamine, partially quaternated with diethyl sulfate or the partially quaternated polymerisation product of ethylene diamine, methyl acrylate and epichlorhydrine are used.

Polyalkylene imines of high molecular weight which may if desired be hydroxylated, for example polyethylene imine, may be named to exemplify the suitable polyamines.

Further examples which may be cited are the compounds defined in British Pat. No. 1,072,118, U.S. Pats. 3,247,048 (notably that of Example 5) and 2,909,302 (especially those of Examples A and B) and French Pat. 1,411,703 (in particular the compound of Example 2).

If the polyamines and polyamide-amines are used singly, their action is manifest only if the solid content of the suspension is not in excess of 25%. The cationic polyamines and polyamide amines, however, in conjunction with guanidine derivatives, show effective action in suspensions and slurries with a solid content of up to 65%. In some circumstances they are effective in smaller amounts than the guanidine derivatives alone. Given a suspension for which 0.01–0.1% of a guanidine derivative relative to the solid content is required, an amount of 0.001–0.03% of one of the polymers will be found sufficient, although the addition can be increased to 0.5% with advantage. Thus the optimum quantitative relation of the polyamine or polyamide amine to the guanidine derivative is 1–500 to 10.

Among the polyamide amines which have proved suitable for the stated purpose are those which have a solution viscosity of 0.01 to 0.5 $\eta_{sp./c.}$ at 5 g./l. concentration in water at 20°±0.1° C. Of these, polyamide amines are prefered which have viscosities of 0.2–0.5 $\eta_{sp./c.}$ at the stated concentration and temperature, while suitable polyamines e.g. are those whose aqueous solutions containing 20% active cationic substance have a viscosity of 500–100 centipoises at 20° C. and 20 r.p.m.

EXAMPLE 1

The assistants are stirred into 80 g. of a crude cement slurry containing 50% solids, of which 20% is clay and 80% chalk, the manufacturer being the Lägerdorf Cement Works near Hamburg (percentages on the dry weight). The slurry contains further the normal cement additives. The slurry is filtered through a press fitted with a synthetic-fibre filter of 3 cm. diameter at 20° C. and 24 atmospheres excess pressure.

The assistants used are calcium hydroxide, a solution, prepared according to Example A of Belgian Pat. No. 729,915, containing 0.032 g. of dry substance and a high molecular-weight cationic polyethylene imine. Prior to use the latter is prepared as an aqueous solution containing 20% active substance with a specific gravity of 1.07 at 20° C. and a viscosity of 500–1000 centipoises measured at 20° C. and 20 r.p.m. with a Brookfield viscometer.

The results are shown in the following Table 1.

TABLE 1

| Assistant | Amount of assistant in relation to solid content of slurry, percent | Filtration time in, minutes | Residual water content of filtercake percent |
|---|---|---|---|
| | | 180 | 22 |
| Ca(OH)₂ | 0.3 | 20 | 23 |
| Guanidine derivative (Example A of Belgian patent No. 729915) | 0.01 | 15 | 22 |
| Polyethylene imine | 0.03 | | |
| Ca(OH)₂ | 0.3 | | |

EXAMPLE 2

If the crude cement slurry specified in Example 1 is filtered in the presence of 0.1% of the guanidine derivative, given above and 0.375% of the compound described in Example 3.2 of Belgian Pat. 721,332, a filtercake of 22% residual water content is obtained at a filtration time of 16 minutes.

EXAMPLE 3

| | Grams |
|---|---|
| Chalk containing a high proportion of montmorillonite relative to the total solid content (source: Lägerdorf Quarry, near Hamburg, Germany) | 32 |
| Water | 48 |
| Chalk suspension | 80 |

A commercial polymerisation product, obtained probably reacting 1 mol of methyl acrylate with a little excess on 1 mol of ethylene diamine and alkylating with a little excess of ½ mol of diethyl sulphate and is used in form of an aqueous solution (in the following said product is defined as "product A"), containing 0.0016 g. dry substance and a guanidine derivative solution according to Example 1 of 0.032 g. dry substance were added to the chalk suspension with vigorous stirring. The suspension was filtered through a filter cloth of synthetic fibre in a suction funnel of 3 cm. diameter at 20° C. and 24 atmospheres pressure. The filtrate was collected in a graduated measuring flask and the filtration time measured in minutes at short intervals, starting from the moment when the pressure reached 24 atmospheres. The volume of filtrate at each interval of measurement was noted in millilitres.

Parallel filtration tests were conducted, the first with 80 g. of the chalk suspension without a filtration aid and every successive one with 80 g. of the suspension and an addition of Product A. The test results are shown in Table 2.

TABLE 2

| Filtration aid | Amount of filtration aid in percent in relation to solid content | Filtration time in minutes | Residual water content of filter residue in, percent |
|---|---|---|---|
| 1 | | 42 | 18 |
| 2 Product A | 0.005 | 26 | 18 |
| 3 {Product A | 0.005 | 8 | 18 |
| {Guanidine derivative | 0.100 | | |

The attached diagrams illustrate the progress of the tests reported in Table 2. The curves are numbered to correspond with the table. The tests were conducted to a residual water content of 18%.

Table 3 below gives the amounts of filtrate in ml. which are obtained in the stated times, employing the procedure of the example with the addition of a commercial polymerisation product, obtained probably by reacting 1 mol methyl acrylate with a little excess on 1 mol of diethylenetriamine and a little excess on 1 mol of epichlorhydrine (in the following said product is defined as "product B"), alone and in combination with the guanidine derivative mentioned in Example 1 and again with the addition of the guanidine derivative alone. The percentages are relative to the dry content of the solutions and the suspensions. The column headings give the weight percentages of the filtration aids relative to the solid content.

TABLE 3

| Filtration time in, minutes | 0.005% Product B | 0.005% Product B, 0.1% guanidine derivative | 0.1% guanidine derivative |
|---|---|---|---|
| 3 | 13 | 25 | 24 |
| 5 | 16 | 32 | 32.5 |
| 8 | 21 | 39 | 37.5 |
| 10 | | 41 | |
| 15 | 29 | | |
| 20 | 31.5 | | |
| 25 | 36 | | |
| 30 | 41 | | |

I claim:

1. A process for treating an aqueous suspension of consisting essentially of water-swellable inorganic material to improve its filterability which comprises incorporating in said suspension a guanidine compound of the formula

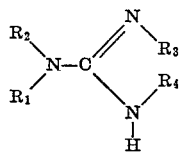

where $R_1$ stands for a hydrogen atom,

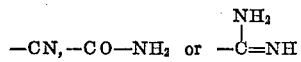

$R_2$ or $R_4$ for a hydrogen atom, a lower alkyl or hydroxyalkyl or a mononuclear aryl group, $R_3$ for a hydrogen atom or a substituted or unsubstituted amino group which is bound through a lower alkylene group and may form part of a heterocyclic ring, $R_4$ or $R_2$ for a substituted or unsubstituted amino group which is bound through a lower alkylene group and may form part of a heterocyclic ring and a member of the group consisting of cationic active polyamines, cationic active polyamide amines and mixtures thereof.

2. A process according to claim 1, in which the guanidine compound is a condensation product of formaldehyde with a compound of the formula

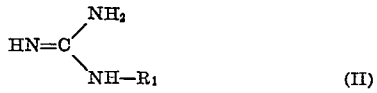

wherein $R_1$ is selected from the group consisting of hydrogen,

—CN and —CONH$_2$

3. A process according to claim 1, wherein Ca(OH)$_2$ is added to the filtration aids.

4. A process according to claim 1 wherein cation-active polyamide-amines and guanidine compound are used in the ratio of 1:10 to 500:10.

5. A process according to claim 4, wherein cation-active polyamines and/or polyamide amines are used in amounts of 0.001 to 0.5% relative to the dry weight of the inorganic material for filtration.

6. Process according to claim 1, wherein to a cement slurry are added 0.03% (on the weight of dry inorganic material) of polyethylene imine, 0.01% (on the weight of dry inorganic material) of the reaction product of 2 mol dicyandiamide with 3 mol formaldehyde in the presence of ammonium chloride and 0.3% (on the weight of dry inorganic material) of a Ca(OH)$_2$.

7. Process according to claim 1, wherein to a chalk suspension are added 0.005% (on the weight of dry inorganic material) of a polymerisation product of methylacrylate and ethylenediamine, alkylated with diethyl sulphate and 0.1% (on the weight of dry inorganic material) of the reaction product of 2 mol dicyandiamide with 3 mol formaldehyde in the presence of ammonium chloride.

8. Process according to claim 1, wherein to a chalk suspension are added 0.005% (on the weight of dry inorganic material) of a polymerisation product of methylacrylate, diethylenetriamine and epichlorhydrine and 0.1% (on the weight of dry inorganic material) of the reaction product of 2 mol dicyandiamide with 3 mol of formaldehyde, in the presence of ammonium chloride.

9. Process according to claim 1, in which the guanidine derivative is a product obtained by condensation of formaldehyde with a compound of Formula II, according to claim 2, in the presence of ammonium salt of strong inorganic acids.

10. A process according to claim 1, wherein the polyamide amines have a solution viscosity of 0.01 to 0.5 $\eta_{sp./c.}$ at 5 g./l. concentration in water at 20°±0.1° C. and the polyamines are those whose aqueous solutions containing 20% active cationic substance have a viscosity of 500–100 centipoises at 20° C. and 20 r.p.m.

11. A process according to claim 2, wherein the polyamide amines have a solution viscosity of 0.01 to 0.5 $\eta_{sp./c.}$ at 5 g./l. concentration in water at 20°±0.1° C. and the polyamines are those whose aqueous solutions containing 20% active cationic substance have a viscosity of 500–100 centipoises at 20° C. and 20 r.p.m.

12. A process according to claim 1, wherein cation-active polyamines and/or cation-active polyamide amines are incorporated in amounts of 0.001 to 0.5% of the dry weight of the inorganic material.

13. A process according to claim 12, wherein cation-active polyamide-amines and guanidine compound are used in the ratio of 1:10 to 500:10.

14. A composition for improving the filterability of aqueous suspensions of water-swellable inorganic material comprising a guanidine compound of the formula

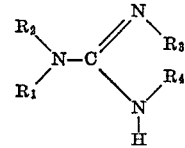

where $R_1$ stands for a hydrogen atom,

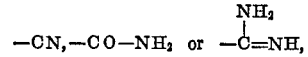

$R_2$ or $R_4$ for a hydrogen atom, a lower alkyl or hydroxyalkyl or a mononuclear aryl group, $R_3$ for a hydrogen atom or a substituted or unsubstituted amino group which is bound through a lower alkylene group and may form part of a heterocyclic ring, $R_4$ or $R_2$ for a substituted or unsubstituted amino group which is bound through a lower alkylene group and may form part of a heterocyclic ring and a member of the group consisting of cationic active polyamines, cationic active polyamide amines and mixtures thereof.

15. An aqueous suspension of water-swellable inorganic material having improved filterability comprising said inorganic material and a composition according to claim 14.

16. A process according to claim 1 wherein the suspension is in the form of a slurry.

17. A process according to claim 16, wherein the slurry is a crude cement slurry.

18. A process according to claim 1, wherein the polyamideamines are the polycondensation product of an ester of acrylic, phenylacrylic, metacrylic, or crotonic acid and a compound of the formula $H_2N-(CH_2)_n-NH_2$ or $H_2N-(CH_2)_n-N-(CH_2)_n-NH_2$ wherein $n$ is 2 to 6 and R is hydrogen or lower alkyl, in which the secondary amino groups are lower alkyl quaternated.

References Cited
UNITED STATES PATENTS

| | | | |
|---|---|---|---|
| 2,374,354 | 4/1945 | Kaplan | 260—309.6 |
| 2,933,529 | 4/1960 | Hwa | 252—357 X |
| 3,200,106 | 8/1965 | Dickson et al. | 252—357 X |
| 3,247,048 | 4/1966 | Gaertner | 162—164 |
| 3,248,353 | 4/1966 | Coscia | 162—164 X |
| 3,327,859 | 6/1967 | Pall | 210—501 X |
| 3,352,424 | 11/1967 | Guebert et al. | 210—503 X |
| 2,587,044 | 2/1952 | Heilmann | 106—100 |
| 2,792,312 | 5/1957 | Geary et al. | 106—100 |
| 3,171,805 | 3/1965 | Suen et al. | 210—54 |
| 3,288,707 | 11/1966 | Hurwitz | 210—52 |
| 3,409,546 | 11/1968 | Mogelnicki et al. | 210—52 |
| 3,484,837 | 12/1969 | Odom et al. | 210—54 |
| 3,632,559 | 1/1972 | Matter et al. | 260—78 SC |
| 3,652,479 | 3/1972 | Mogelnicki et al. | 210—52 X |

SAMIH N. ZAHARNA, Primary Examiner

R. W. BURKS, Assistant Examiner

U.S. Cl. X.R.

210—503